(12) United States Patent
Ricks

(10) Patent No.: US 11,543,678 B2
(45) Date of Patent: Jan. 3, 2023

(54) OPTICS MOUNT FOR OVER-THE-GLASSES EYEWEAR

(71) Applicant: Six15 Technologies, Henrietta, NY (US)

(72) Inventor: Theodore K. Ricks, Pittsford, NY (US)

(73) Assignee: Six15 Technologies, Henrietta, NY (US)

( * ) Notice: Subject to any disclaimer, the term of this patent is extended or adjusted under 35 U.S.C. 154(b) by 219 days.

(21) Appl. No.: 17/142,334

(22) Filed: Jan. 6, 2021

(65) Prior Publication Data

US 2021/0215950 A1   Jul. 15, 2021

Related U.S. Application Data

(60) Provisional application No. 62/960,204, filed on Jan. 13, 2020.

(51) Int. Cl.
| | |
|---|---|
| G02C 5/02 | (2006.01) |
| G02C 9/00 | (2006.01) |
| G02C 11/00 | (2006.01) |
| G02C 9/02 | (2006.01) |
| G02C 5/12 | (2006.01) |

(52) U.S. Cl.
CPC ............... *G02C 5/02* (2013.01); *G02C 5/12* (2013.01); *G02C 9/02* (2013.01); *G02C 11/10* (2013.01)

(58) Field of Classification Search
CPC ...................................................... G02C 5/02
See application file for complete search history.

(56) References Cited

U.S. PATENT DOCUMENTS

| | | | | | |
|---|---|---|---|---|---|
| 5,971,538 | A | * | 10/1999 | Heffner ................... | G02C 5/122 |
| | | | | | 351/137 |
| 2003/0142263 | A1 | * | 7/2003 | Caplan ..................... | G02C 11/04 |
| | | | | | 351/57 |
| 2021/0216264 | A1 | * | 7/2021 | Nagai ..................... | G06F 3/1423 |

* cited by examiner

*Primary Examiner* — Darryl J Collins
(74) *Attorney, Agent, or Firm* — Louis S. Horvath

(57) ABSTRACT

A display apparatus for wearing over corrective eyewear has a frame structure that supports left- and right-side protective lenses, wherein each protective lens has a rear surface disposed to face toward the corrective eyewear, and a front surface disposed to face the outside-world object scene. A bridging member is hinged to the frame between the left- and right-side protective lenses, wherein the bridging member extends a nose bridge engagement member toward a viewer nose position, wherein the bridging member further has a coupling configured to removably suspend at least one output element of an electronically energized display system over the front surface of the left- or right-side protective lens.

10 Claims, 11 Drawing Sheets

OPTICS MOUNT FOR OVER-THE-GLASSES EYEWEAR

The present application claims the benefit of U.S. Provisional application Ser. No. 62/960,204, provisionally filed on Jan. 13, 2020 entitled "OPTICS MOUNT FOR OVER-THE-GLASSES EYEWEAR" in the name of Theodore K. Ricks, incorporated herein by reference in its entirety.

FIELD OF THE INVENTION

This disclosure generally relates to head-mounted optics and more particularly to apparatus for mounting displays and other optical components to eyewear.

BACKGROUND

Eyewear that is widely used includes safety or protective eyewear that is worn over existing prescription, reading, or other types of eyeglasses. This general class of items includes Over-The-Glasses (OTG) eyewear, useful in a range of applications such as warehousing, manufacturing, and parts handling, for example, as well as in sport, exercise, and other applications. OTG safety glasses can be required for viewers who need corrective lenses of some type in order to perform some task or function and also need extra protection from environmental hazards during various activities.

One shortcoming of existing OTG eyewear design relates to adaptability for use with, and attachment of, head-mounted display (HMD) apparatus and other head-mounted optics, particularly for optical devices that are energized or that act as outputs for energized optical systems, including filters, polarizers, and other components. There can be limited flexibility for use with various optical arrangements, such as with multiple or layered displays. Even without additional head-mounted optics, conventional OTG solutions are generally cumbersome and can be awkward to the wearer and difficult to reconfigure.

Thus, it can be appreciated that there is need for OTG solutions that allow sufficient spacing for comfortable use by the eyeglass wearer and also provide flexible coupling mechanisms for added displays and other optics for one or both eyes of the wearer.

SUMMARY OF THE DISCLOSURE

It is an object of the present invention to advance the art of head-mounted display mounting.

With at least this object in mind, the present disclosure provides a display apparatus for wearing over corrective eyewear, the display apparatus comprising:
   a frame structure that supports left- and right-side protective lenses, wherein each protective lens has a rear surface disposed to face toward the corrective eyewear, and a front surface disposed to face the outside-world object scene;
   a bridging member that is hinged to the frame between the left- and right-side protective lenses, wherein the bridging member extends a nose bridge engagement member toward a viewer nose position,
   wherein the bridging member further has a coupling configured to removably suspend at least one output element of an electronically energized display system over the front surface of the left- or right-side protective lens.

According to an alternate embodiment of the present disclosure, there is provided protective eyewear for wearing over corrective eyeglasses and having a bridging member that joins a left and a right frame portion, wherein the bridging member comprises:
   a) a right coupling arm that extends from a central body of the bridging member in a first direction and that is configured for fastening to the right frame portion that supports a right lens of the protective eyewear;
   b) a left coupling arm that extends from the central body of the bridging member in a second direction that is opposite the first direction and that is configured for fastening to the left frame portion that supports a left lens of the protective eyewear;
   c) a nose bridge that extends from the bridging member in a direction orthogonal to the left and right coupling arms, wherein an extension distance of the nose bridge from the central body is adjustable for seating the bridging member against a wearer's nose;
   and
   d) a display coupling that extends from the bridging member and that is configured to removably grip and suspend an output element of an electronically energized optical system over one of, or both, the right and left lens of the protective eyewear.

Additional features and advantages will be set forth in part in the description which follows, being apparent from the description or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

While the specification concludes with claims particularly pointing out and distinctly claiming the subject matter of the present disclosure, it is believed that embodiments will be better understood from the following description when taken in conjunction with the accompanying drawings.

DETAILED DESCRIPTION

Figure 1A:
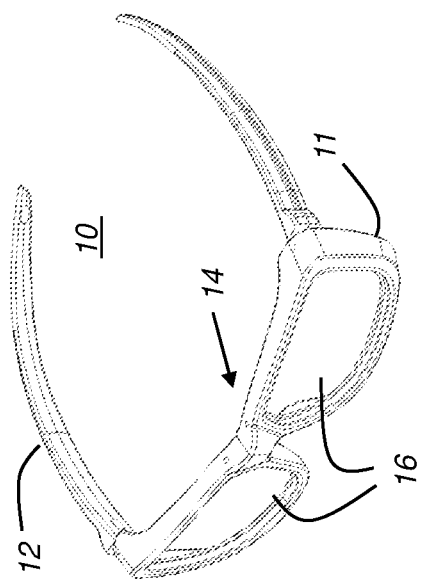
FIGS. 1A and 1B show perspective and partially exploded views, respectively, of a pair of conventional OTG eyewear.

It is to be understood that elements not specifically shown or described herein may take various forms well known to those skilled in the art. Figures shown and described herein are provided in order to illustrate key principles of operation and component relationships according to the present disclosure and are not drawn with intent to show actual size or scale.

Where they are used, the terms "first", "second", "third", "fourth", and so on, do not necessarily denote any ordinal or priority relation, but are simply used to more clearly distinguish one element from another.

In the context of the present disclosure, the term "energizable" describes a component or device that is enabled to perform a function upon receiving power and, optionally, upon also receiving an enabling signal.

Various relative terms such as "above," "below," "top," "bottom," "front," "rear," "height," "depth," "width," and "length," etc. may be used in the present disclosure to facilitate description of various embodiments and to help distinguish one side or surface of a component or assembly from its opposite side or surface or to distinguish different views or dimensions. The relative terms are defined with respect to a conventional orientation of a structure as typically portrayed and do not necessarily represent an actual orientation of the structure in manufacture or use. The following detailed description is, therefore, not to be taken in a limiting sense as to component orientation or configuration.

The term "surface" has its conventional meaning as used in geometry, indicating a planar or curved face of an object, where the face is considered to have length and breadth, but without thickness. For an optical component, the surface can be treated to condition incident light or the light path, such as to reflect or filter light. The treatment can be on one surface or on its opposite surface, as well as on both surfaces. The term "edge" has its conventional meaning, denoting a border or margin where a surface ends, and can be considered to have thickness, but no length or breadth. The periphery of an optical surface can be considered to be that portion of the surface that lies along the edge and outside of the clear aperture.

The term "oblique" is used herein to refer to an angular relationship that is other than substantially orthogonal or parallel, that is, at an angle that deviates by at least about 5 degrees or more from any integer multiple of 90 degrees.

In the context of the present disclosure, the terms "configured", "conditioned", "treated", "coated", or "formed" can be used equivalently with respect to the fabrication of thin film filters designed to provide a particular spectral characteristic, also termed a "filter characteristic" in the context of the present disclosure. A surface is considered to be transmissive to a particular wavelength if it transmits at least 75 percent of the light that is incident at that wavelength. A surface is considered to reflect a given wavelength of incident light if it reflects at least 80 percent of the light that is incident at that wavelength.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

With relation to dimensions given herein, the term "substantially" means within better than +/−12% of a geometrically exact dimension, unless otherwise more specifically stated. Thus, for example, a first dimensional value is substantially half of a second value if it is in the range of from about 44% to about 56% of the second value. Positions in space are "near" each other or in close proximity when, relative to an appropriate reference dimension or distance such as a radius of curvature, distance from a focal point, a component location, or other point on an optical axis, distance dimensions are substantially the same, no more than about 12% apart, preferably within 5% or 1% or less distance from each other.

In the context of the present disclosure, the terms "user", "wearer", and "viewer" may be considered equivalent when referring to the person wearing the display apparatus or other optic using the mounting device or technique described herein.

In the context of the present disclosure, an "output element of an electronically energized optical system" is suspended to a position within the field of view of an eye. The output element can be a display, such as an organic light-emitting diode (OLED) or other energizable display component, or can be a display element that serves as the output of an optical system that has an energized display component. The output element can be a transmissive prism or light guide, for example, that forms an image from modulated light that is provided from a scanning component or a display component of the optical system. Alternatively, the output element can be a modulated device such as a polarizer, including a liquid crystal device, or energizable filter element or other spatial light modulator. According to an embodiment of the present disclosure, the output element of an electronically energized optical system has a diopter that is preferably within the range of +/−1 diopter.

The term "corrective eyewear" includes eyeglasses and any other device that is worn over at least some portion of the visual field of the viewer to improve vision. OTG eyewear allows sufficient space to allow the wearer to wear prescription eyeglasses, reading glasses, tinted or polarized glasses, or other type of corrective eyewear disposed within the space between the OTG eyewear and the viewer's eyes. It can be appreciated that the OTG eyewear described herein does not require the viewer to wear eyeglasses, but provides allowable space and conditions to make it feasible for the viewer to wear eyeglasses comfortably while enjoying the features and added protection afforded by the OTG eyewear.

Figure 1B:
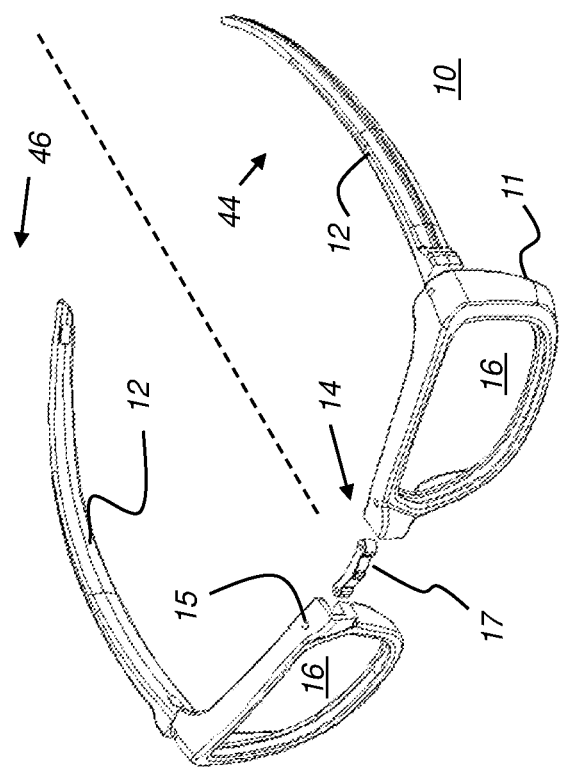

FIGS. 1A and 1B show perspective and partially exploded views, respectively, of a pair of conventional eyewear 10, such as OTG eyeglasses. A frame 11 with side eyewear arms 12 mounts protective outer left- and right-eye lenses 16 on opposite sides of a hinged bridge 14. A bridge element 17 can be formed as a band, bar, stiff or flexible extender, or other structure that couples to right and left sections of frame 11. A coupling feature 15 accepts a fastener or a bonding material for holding bridge 14 in place in frame 11. With respect to bridge 14, frame 11 has two sections, as shown in FIG. 1B: (i) a left section 44 with a left external protective lens 16 and a left eyewear arm 12; and (ii) a corresponding right section 46 with a right external protective lens 16 and a right eyewear arm 12. Left and right eyewear arms 12 extend rearward (or ear-ward), as in standard eyeglasses.

An embodiment of the present disclosure effectively replaces bridge 14 with a modular display adapter that allows mounting of one or more displays or other output element of an electronically energized optical system, suspended into the left- or right-eye field of view, such as along or near the left or right visual axis. The modular display adapter may slightly increase the horizontal distance between outer protective lenses 16 (that is, distance measured along a line extending between left and right pupils of the viewer, substantially parallel to the x-axis as shown in FIG. 2C) and also provides a dual-hinge arrangement to modify the bridge of the eyewear 10 for conformance to variables of wearer head shape and eyewear profile and to allow a measure of rotation independence for each of the protective lenses 16. The dual-hinge configuration further allows increased flexibility for shielding the prescription glasses or other correctional eyewear that the OTG eyewear encloses.

Figures 2A, 2B:
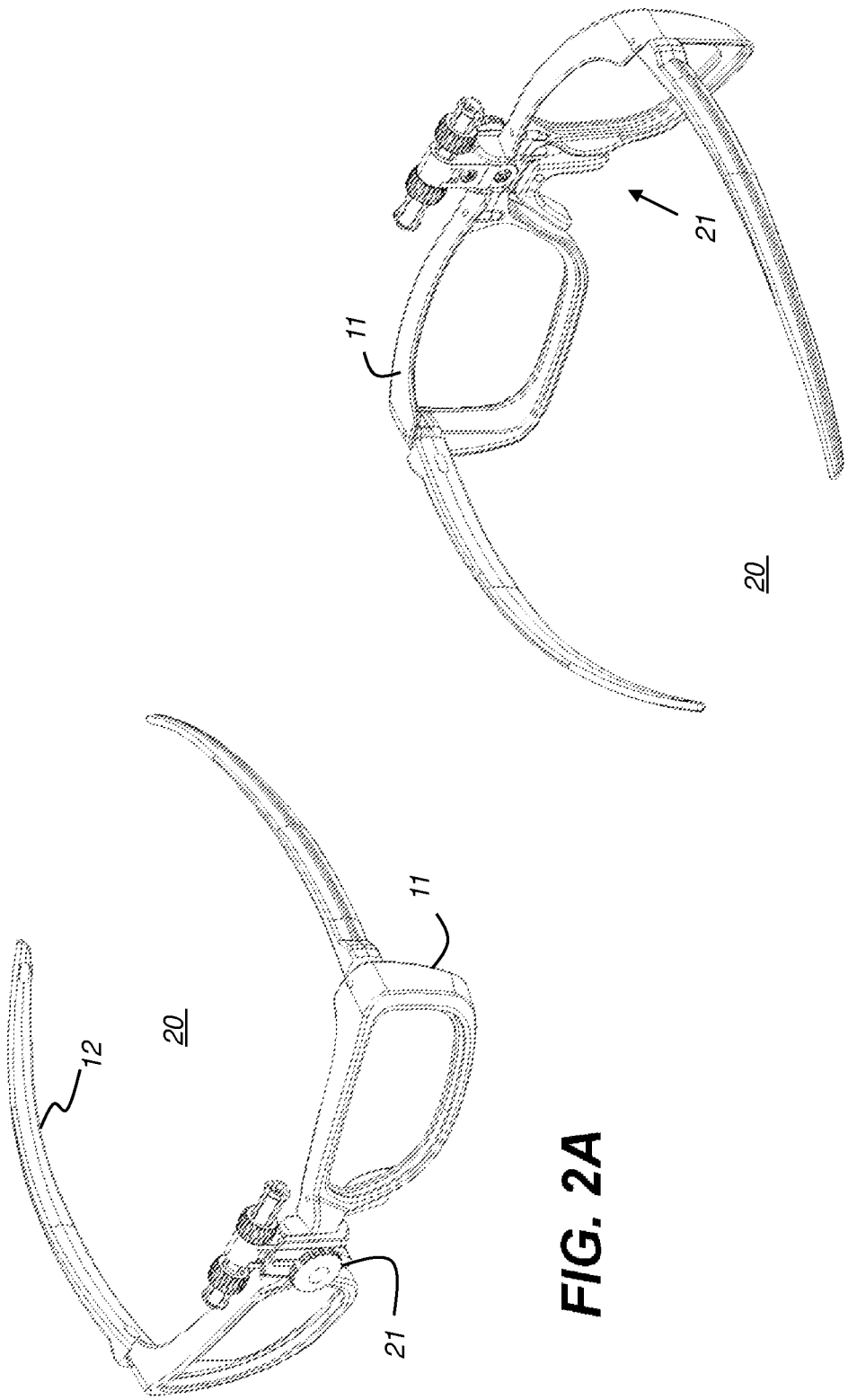
FIGS. 2A and 2B show perspective front and rear views, respectively, of OTG eyewear having a display adapter module as an alternative bridging member.
Figure 2C:
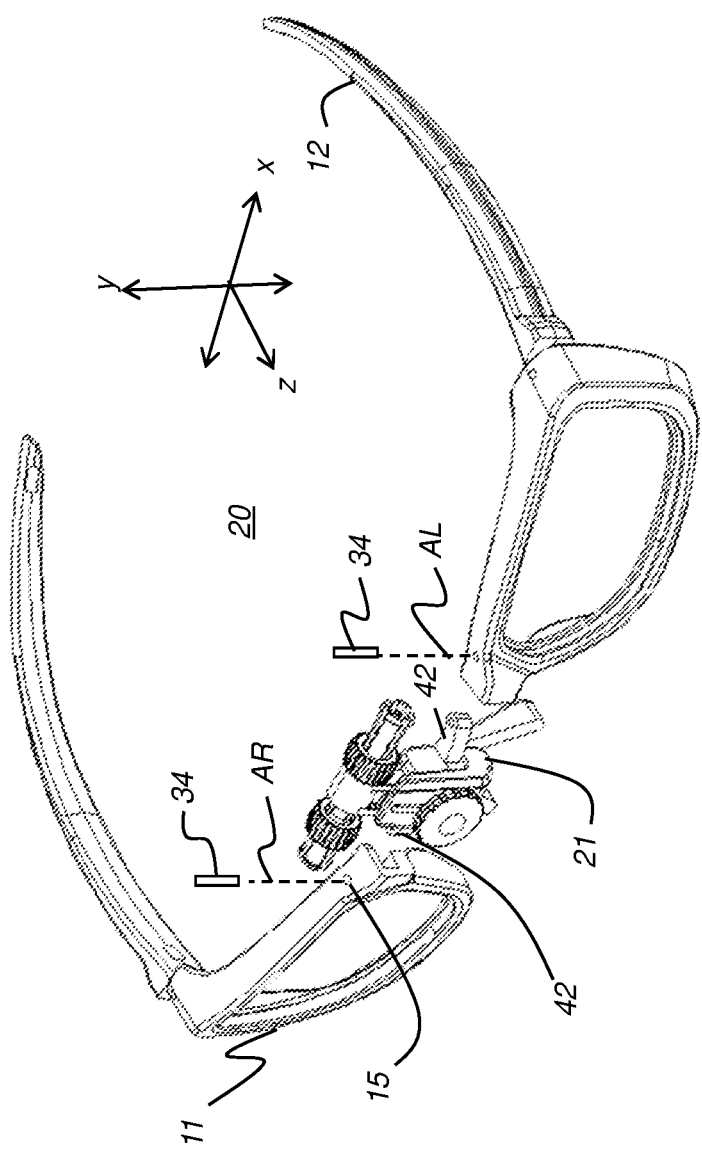
FIG. 2C is a partially exploded view that shows how the display adapter module fits into a frame according to an embodiment of the present disclosure.

FIGS. 2A and 2B show perspective front and rear views, respectively, of OTG eyewear 20 having a display adapter module 21 as an alternative bridging member that provides both hinging movement and a support structure for coupling a display or other output element of an electronically energized optical system to eyewear frame 11. Display adapter module 21 can be installed by disassembling frame 11 at bridge 14, as shown in FIG. 1B, and replacing bridge element 17 with adapter module 21.

FIG. 2C is a partially exploded view that shows how display adapter module 21 fits into frame 11 according to an embodiment of the present disclosure. Fasteners 34, such as screws or pins, mount extended left and right coupling arms 42 to frame coupling features 15, thereby forming two hinges: a hinge rotatable about a left axis AL and a hinge rotatable about a right axis AR (left- and right-features relative to the viewer).

Figure 3B:
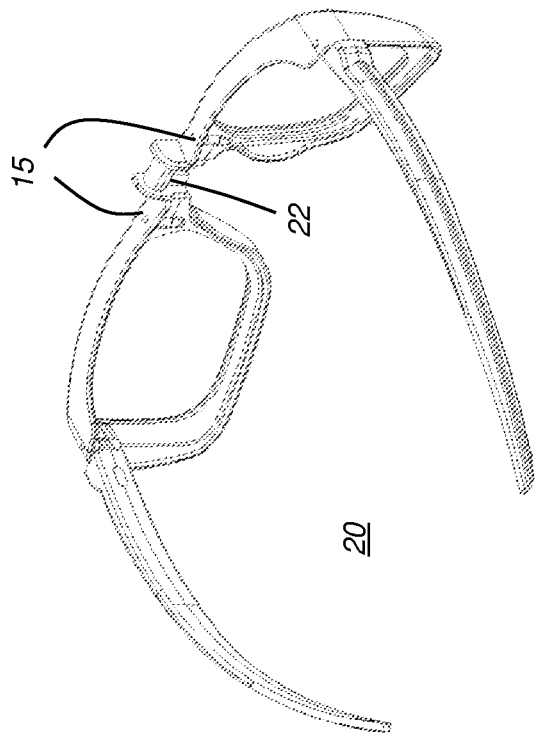
FIGS. 3A and 3B show front and rear views, respectively, of a head-mounted display bridge which serves as a structure for attaching the display adapter module to the frame.
Figure 3A:
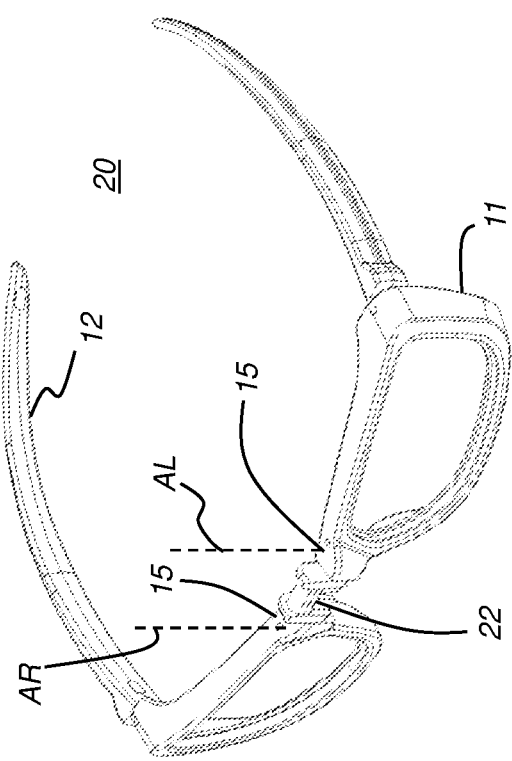

FIGS. 3A and 3B show front and rear views, respectively, of a head-mounted display bridging member 22 which serves as a structure for attaching display adapter module 21 to frame 11. Display bridging member 22 attaches to frame 11 at left and right frame coupling features 15.

Figure 4A:
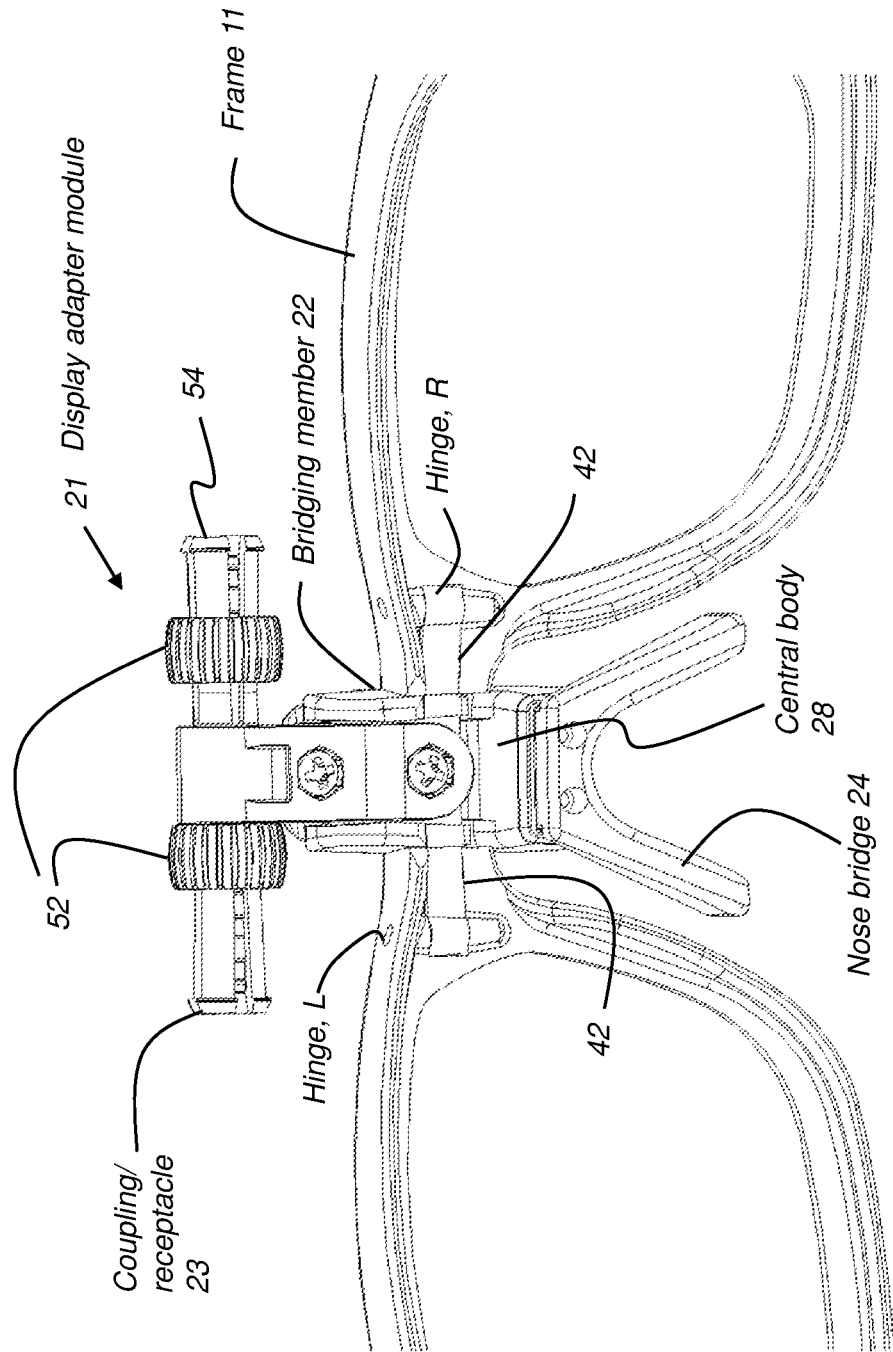
FIG. 4A is a rear view showing features of the display adapter module.
Figure 4B:
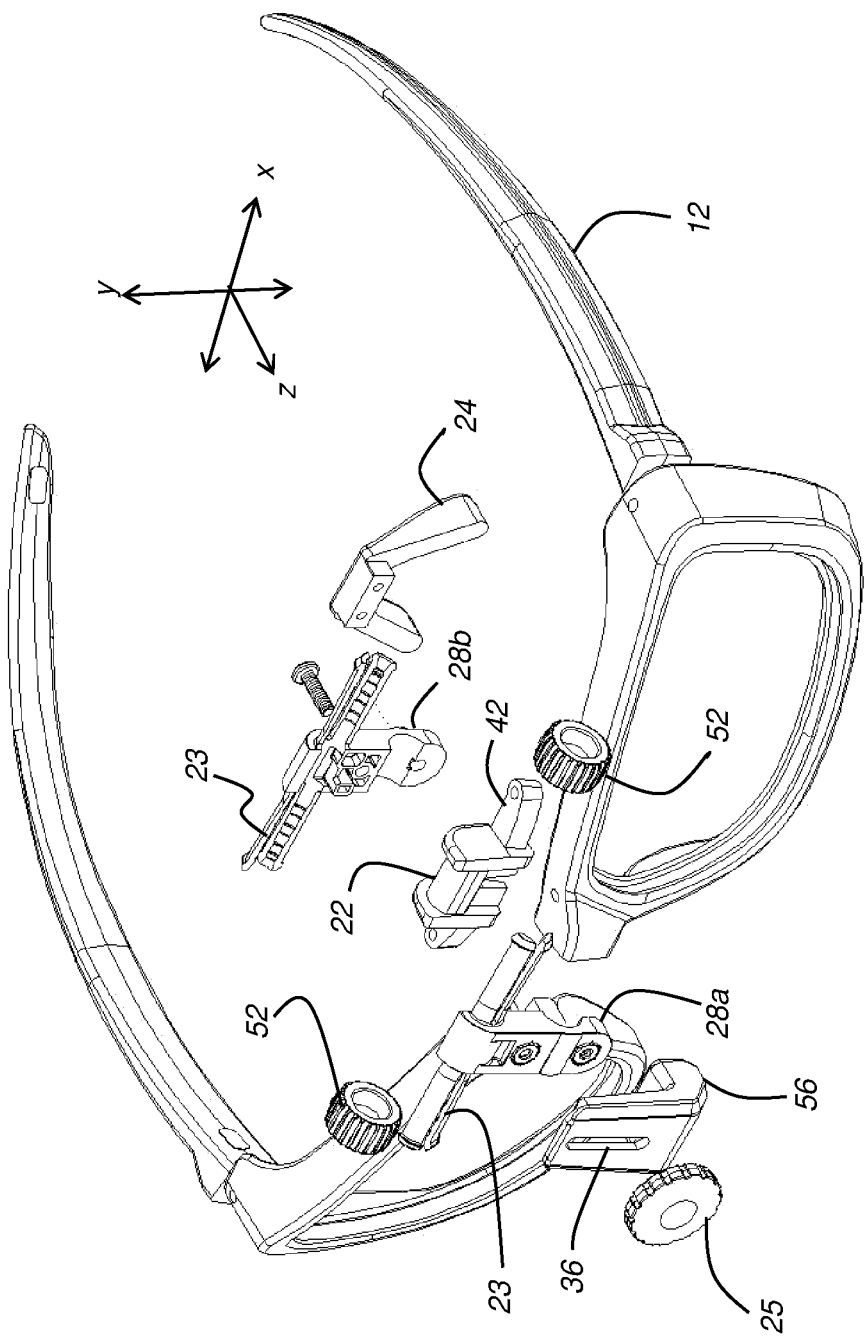
FIG. 4B shows a partially exploded view of the display adapter module.

FIG. 4A is a rear view showing features of display adapter module 21. FIG. 4B shows a partially exploded view of the display adapter module 21.

Figure 5A:
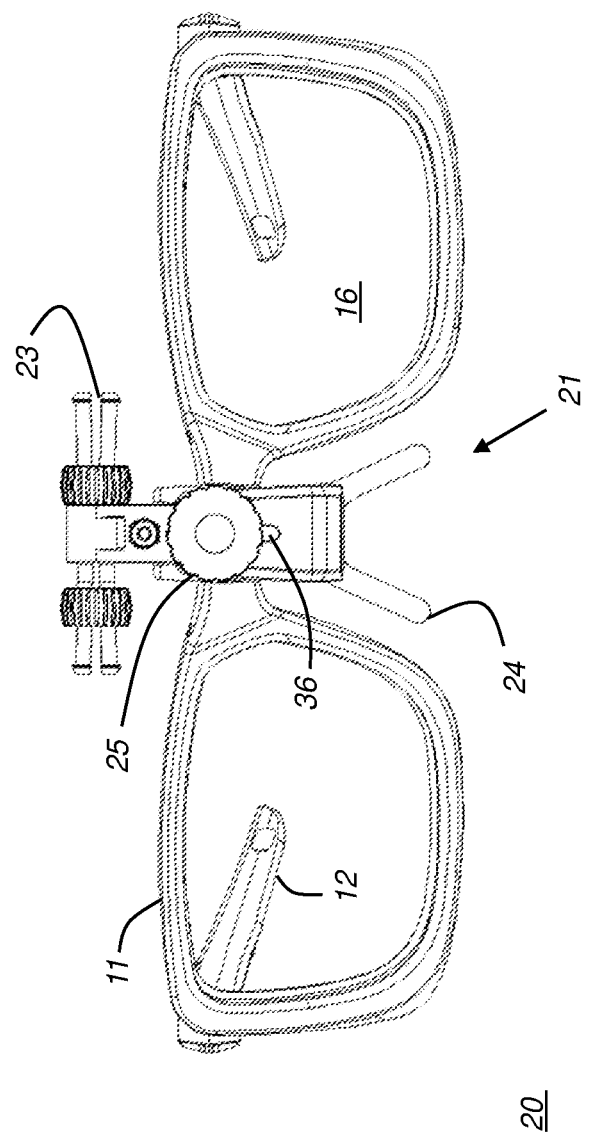
FIGS. 5A and 5B show adjustment positions of the nose bridge.
Figure 5B:
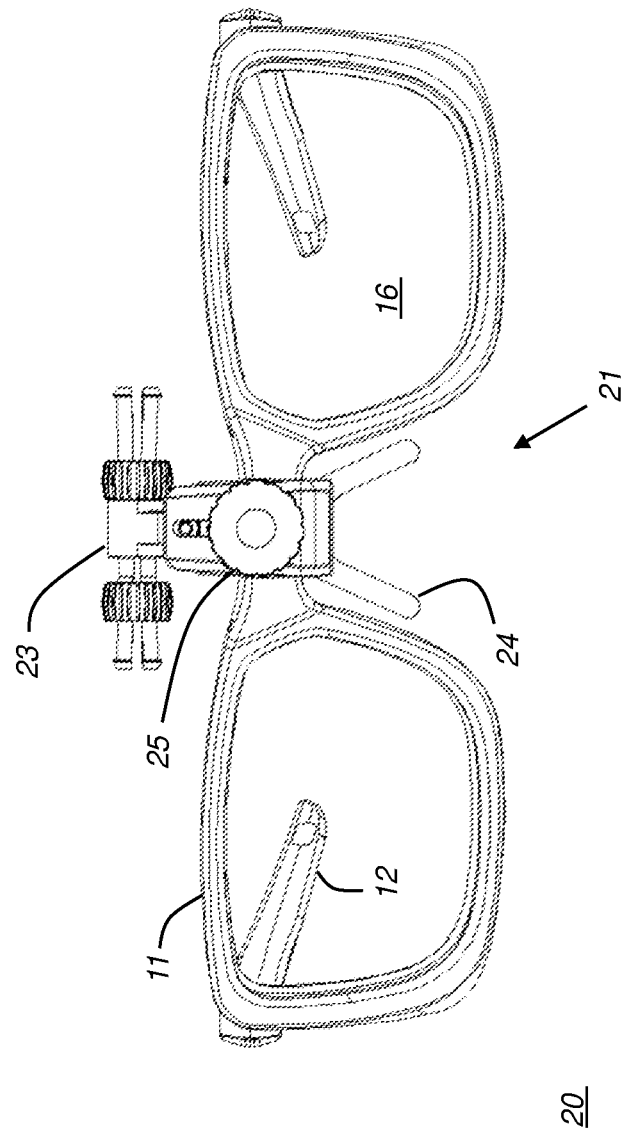

Display adapter module 21 has front and rear sections or coupling members 28a and 28b that are configured to couple together onto display bridging member 22, using fasteners such as screws or, alternately, using an adhesive. Coupling receptacle 23 is formed from front and rear sections when fastened together. A coupler 52 is provided for securely coupling a component to each side of coupling receptacle 23. A compressive coupler 52 is shown as one type of coupling receptacle 23; this is in the form of a slidable ring that is moved linearly, along the horizontal track (in the view of FIG. 4A) defined along a segmented tube 54, to apply compression against a shaft or connecting arm that seats the display components. The ring-and-tube coupling receptacle 23 arrangement that is shown can be advantageous for allowing shaft repositioning for translation along the x-axis direction and for shaft rotation about the x axis (FIG. 4B); no tools are required for these adjustments. A nose bridge engagement member 24 attaches to a bracket 56. A nose bridge height adjuster and lock 25 and bracket 56 can enable vertical movement of nose bridge engagement member 24 to a suitable position for nose engagement, with adjustment along a track 36, as illustrated in two positions in FIGS. 5A and 5B.

Figure 6:
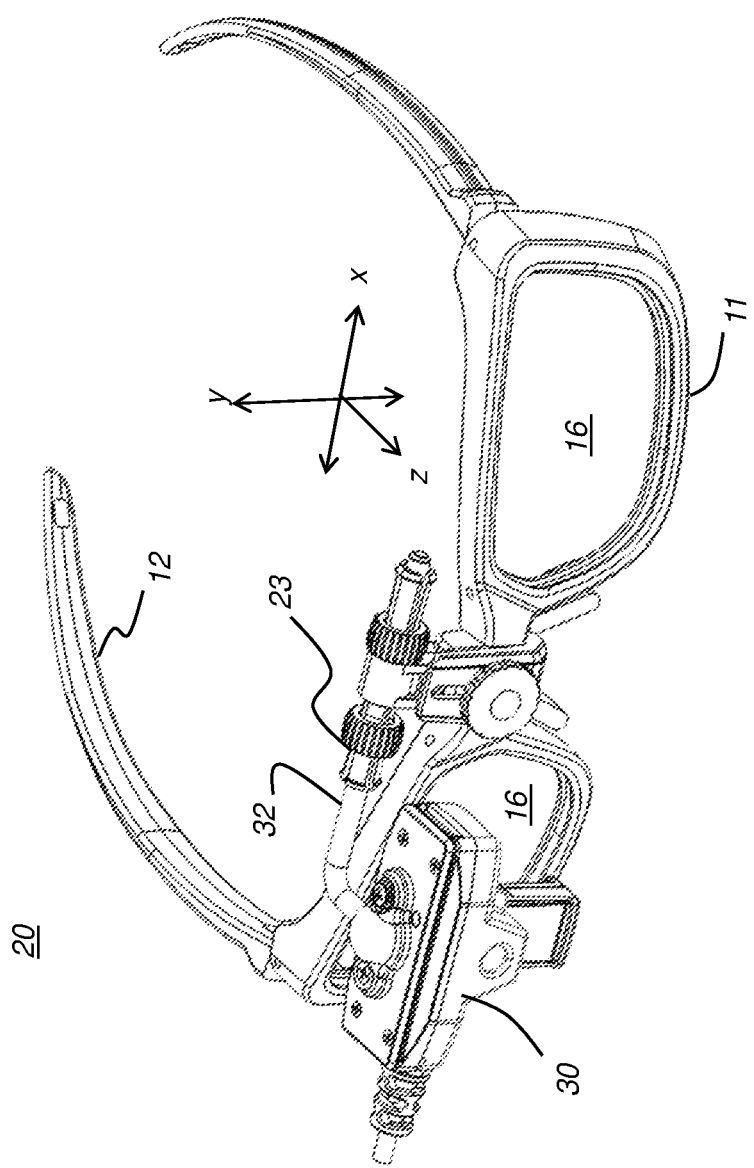
FIG. 6 shows an example of OTG eyewear having a display module mounted on a display coupling for monocular display viewing.

Display coupling 23 can provide a two-sided receptacle for suspending a display or other optic into the field of view of one or both eyes of the viewer. In this embodiment, as shown in FIG. 6, compressive display coupling 23 is configured to removably grip a shaft or connecting arm 32 that suspends an output element of an electronically energized optical system 30, such as a monocular display, over the right or left lens 16 of eyewear 20. This mounting arrangement allows positioning along the x axis and rotation about an axis that is substantially parallel to the x axis.

Figure 7:
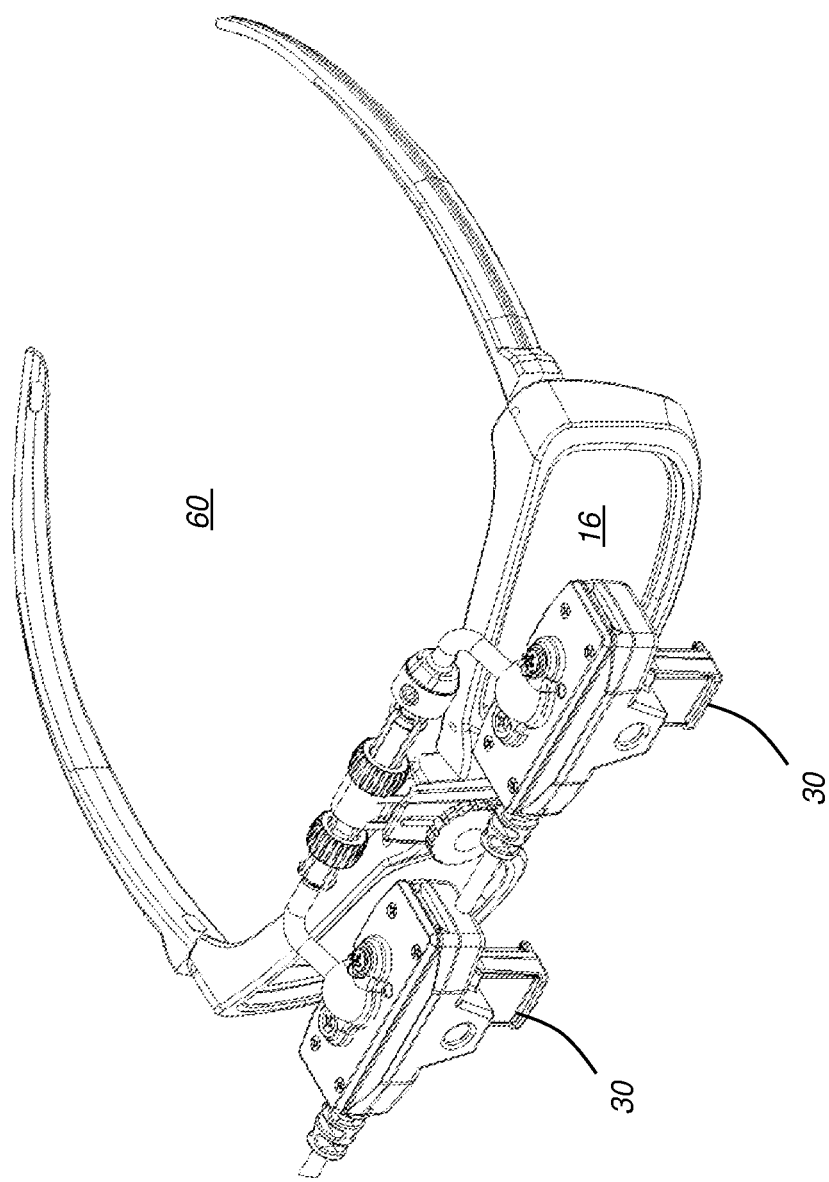
FIG. 7 shows an embodiment of eyewear with two output elements of electronically energized optical systems, one in the field of view of each eye.

FIG. 7 shows an embodiment of eyewear 60 with two output elements of electronically energized optical systems 30, one in the field of view of each eye. The two output elements 30 can be of the same type, such as identical display components providing the same type of display output, or may be of different types, such as a display and a dynamically changing light modulator or polarizer, for example.

Figure 8:
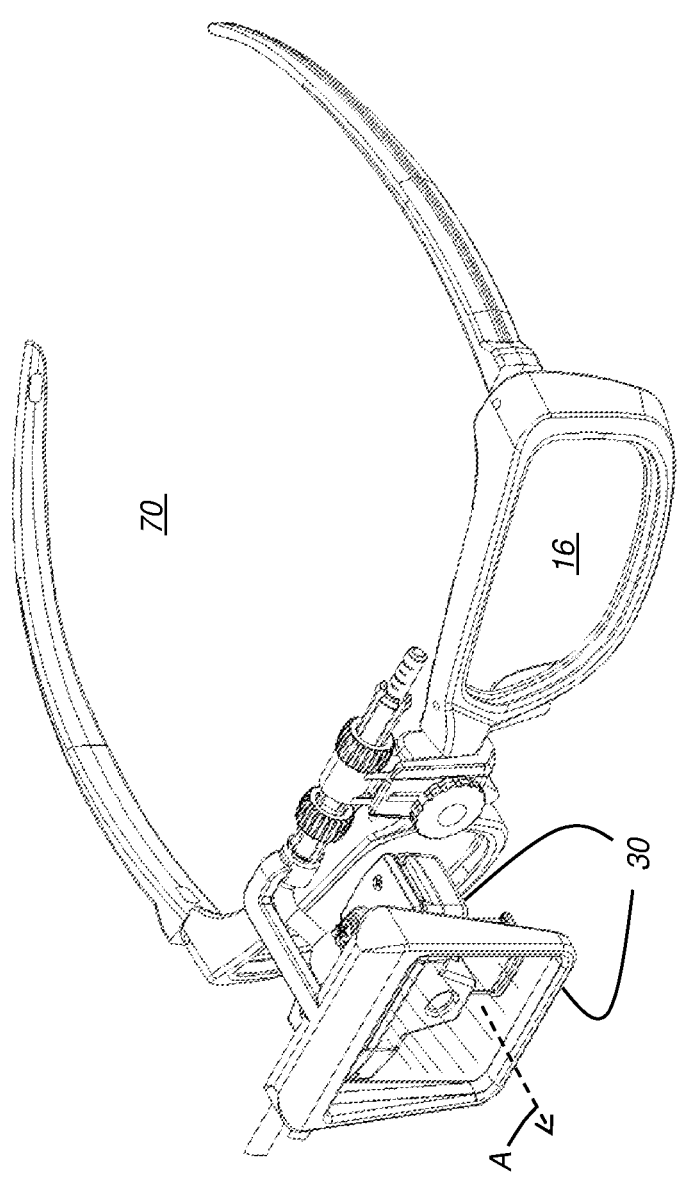
FIG. 8 shows an embodiment of eyewear with multiple stacked output elements of electronically energized optical systems in the field of view of a single eye.

FIG. 8 shows an embodiment of eyewear 70 with multiple stacked output elements of electronically energized optical systems 30 in the field of view of a single eye. The use of stacked output elements, disposed at different distances along or in the direction of a visual axis A of the left- or right-eye of the viewer, enables the viewer to view different generated content, simultaneously displayed along the same visual axis. Thus, for example, the viewer can have a first display output that provides useful numeric and measured data, superimposed or alongside the output of a second display system that displays image data. One output element in the stack can optionally operate in virtual reality (VR) mode, obscuring visibility of content beyond the output element; a second output element in the stack can operate in augmented reality (AR) mode, superimposing generated image content on the real-world scene in the viewer FOV or against the VR display content.

According to an embodiment of the present disclosure, a bridging member for eyewear has: a) a right coupling arm that extends from a central body of the bridging member and is configured for fastening to a frame portion that supports a right lens of the eyewear; b) a left coupling arm that extends from the central body and is configured for fastening to a frame portion that supports a left lens of the eyewear; c) a nose bridge that extends from bridging member in a direction orthogonal, or at least substantially orthogonal, to the left coupling arm, wherein an extension distance of the nose bridge from the central body is adjustable for seating against a wearer's nose; and. d) a coupling extending from the bridging member in a direction opposite to the nose bridge and that is configured to removably grip and suspend an output element of an electronically energized optical system over the right or left lens of the eyewear. The eyewear can be a pair of safety glasses, wherein at least one of the right and left coupling arms fasten to the frame of the safety glasses to form a hinge. The output element of an electronically energized optical system preferably has relatively low power or zero power, such as having a diopter that is within the range of +/−1 diopter.

OTG eyewear apparatus can have a frame having a left section with a left external lens and a left eyewear arm and further having a right section with a right external lens and a right eyewear arm; and a display adapter module having a left bridging arm extended outward from a central body and coupled to the left section along a left rotational axis and a corresponding right bridging arm extended outward from the central body and coupled to the right section along a right rotational axis, wherein the display adapter module further has a coupling configured for suspending a monocular optic over the right or left lens of the safety glasses. The display adapter module further can have an extending nose bridge configured for seating against a wearer's nose. The nose bridge can have an adjustable extension distance.

The display adapter module allows the positioning of an output element of an electronically energized optical system over each lens of the eyewear. Alternately, the display adapter module can allow a stacked arrangement that has multiple electronically energized optical system output elements in the field of view of the left eye or the right eye.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. The mount apparatus of the present disclosure can be used in a similar manner for any of a number of types of optics.

The invention claimed is:

1. Protective eyewear for wearing over corrective eyeglasses and having a bridging member that joins a left and a right frame portion, wherein the bridging member comprises:
   a) a right coupling arm that extends from a central body of the bridging member in a first direction and that is configured for fastening to the right frame portion that supports a right lens of the protective eyewear;
   b) a left coupling arm that extends from the central body of the bridging member in a second direction that is opposite the first direction and that is configured for fastening to the left frame portion that supports a left lens of the protective eyewear;
   c) a nose bridge that extends from the bridging member in a direction orthogonal to the left and right coupling arms, wherein an extension distance of the nose bridge from the central body is adjustable for seating the bridging member against a wearer's nose; and
   d) a display coupling that extends from the bridging member and that is configured to removably grip and suspend an output element of an electronically energized optical system over one of, or both, the right and left lens of the protective eyewear,
   wherein at least one of the right and left coupling arms fasten to the corresponding right or left frame portion to form a hinge.

2. The protective eyewear of claim 1 wherein the protective eyewear is a pair of safety glasses.

3. The protective eyewear of claim 1 wherein the display coupling is configured to apply compression against a shaft or connecting arm that is coupled to the output element of the optical system.

4. An over-the-glasses eyewear apparatus comprising:
   a) a frame having a left section with a left protective lens and a left eyewear arm extending away from the left protective lens and further having a right section with a right protective lens and a right eyewear arm extending away from the right protective lens; and
   b) a display adapter module having a left coupling arm extended outward from a central body and coupled to the left section of the frame along a left rotational axis and a corresponding right coupling arm extended outward from the central body and coupled to the right section of the frame along a right rotational axis, wherein the display adapter module further has a display coupling configured for suspending a monocular optic over either or both the right and left protective lens.

5. The apparatus of claim 4 wherein the display adapter module further has an extending nose bridge configured for seating against a wearer's nose.

6. The apparatus of claim 5 wherein the nose bridge is configured to provide an adjustable extension distance.

7. The apparatus of claim 4 wherein the left coupling arm cooperates with the frame to form a hinge about the left rotational axis.

8. The apparatus of claim 4 wherein the display coupling allows translation along and rotation about the same axis.

9. The apparatus of claim 4 wherein the monocular optic is a first monocular optic and further comprising suspending a second monocular optic over either or both right and left lenses.

10. The apparatus of claim 4 wherein the display coupling has a slidable ring that cooperates with a segmented tube to apply compression against a shaft that is coupled to an output element of an electronically energized display system.

* * * * *